United States Patent
Yang

(10) Patent No.: US 8,521,863 B2
(45) Date of Patent: Aug. 27, 2013

(54) METHOD AND DEVICE FOR OPERATING RESOURCE ON SHARED NETWORK ELEMENT

(75) Inventor: Shengqiang Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/552,413

(22) Filed: Jul. 18, 2012

(65) Prior Publication Data

US 2012/0284388 A1 Nov. 8, 2012

Related U.S. Application Data

(63) Continuation of application No. PCT/CN2011/070338, filed on Jan. 17, 2011.

(30) Foreign Application Priority Data

Jan. 18, 2010 (CN) .......................... 2010 1 0001030

(51) Int. Cl.
*G06F 15/173* (2006.01)

(52) U.S. Cl.
USPC .......................................... 709/223; 709/224

(58) Field of Classification Search
USPC .......... 709/203, 223, 224; 719/330; 455/414
See application file for complete search history.

(56) References Cited

U.S. PATENT DOCUMENTS

| | | | | |
|---|---|---|---|---|
| 6,625,590 | B1 * | 9/2003 | Chen et al. ..................... | 709/223 |
| 6,980,997 | B1 * | 12/2005 | Peschel-Gallee et al. .... | 719/330 |
| 2003/0032409 | A1 * | 2/2003 | Hutcheson et al. ........... | 455/414 |
| 2004/0105429 | A1 | 6/2004 | Anckar et al. | |
| 2007/0264986 | A1 | 11/2007 | Warrillow et al. | |
| 2009/0047957 | A1 | 2/2009 | Westerberg | |
| 2012/0030373 | A1 | 2/2012 | Yang | |

FOREIGN PATENT DOCUMENTS

| | | |
|---|---|---|
| CN | 1744761 A | 3/2006 |
| CN | 1879441 A | 12/2006 |
| CN | 1929397 A | 3/2007 |
| CN | 101505505 A | 8/2009 |
| CN | 101511131 A | 8/2009 |
| CN | 101764711 A | 6/2010 |
| EP | 0952698 A2 | 10/1999 |
| EP | 1327934 A1 | 7/2003 |
| WO | WO 2008/112688 A1 | 9/2008 |

OTHER PUBLICATIONS

International search report for International application No. PCT/CN2011/070338, dated Apr. 28, 2011, total 4 pages.

(Continued)

*Primary Examiner* — Quang N Nguyen

(74) *Attorney, Agent, or Firm* — Leydig, Voit & Mayer, Ltd.

(57) ABSTRACT

Management of resources on a shared network element is provided to enhance security of user information of the operators having access to the network element. An operation management command is received from a user for operating a resource on a shared network element. According to the operation management command, an operator attribute of the resource to be operated and an operator attribute of the user are acquired. In instances where the operator attribute of the user is consistent with the operator attribute of the resource to be operated, an operating action corresponding to the operation management command is performed.

8 Claims, 4 Drawing Sheets

(56) References Cited

OTHER PUBLICATIONS

First page of issued document of corresponding Chinese patent application No. 201010001030.6 with cited references in item (56), issued date Apr. 25, 2012, one page only.

Extended European Search Report in corresponding European Application No. 11732688.4 (Dec. 14, 2012).

Written Opinion of the International Searching Authority in corresponding PCT Application No. PCT/CN2011/070338 (Apr. 28, 2011).

* cited by examiner

METHOD AND DEVICE FOR OPERATING RESOURCE ON SHARED NETWORK ELEMENT

CROSS REFERENCE TO RELATED APPLICATIONS

This application is a continuation of International Patent Application No. PCT/CN2011/070338 filed on Jan. 17, 2011. The international Patent Application claims priority to Chinese Patent Application No. 201010001030.6, filed on Jan. 18, 2010. Both of the aforementioned patent applications are hereby incorporated by reference in their entirety.

TECHNICAL FIELD

The present invention relates to the field of telecommunication network management technologies, and in particular, to a method and a device for operating a resource on a shared network element.

BACKGROUND

A telecommunication management network (TMN) architecture is a reference model for a telecommunication management method, and the purpose thereof is to distribute various functions to different layers, for example, a network management layer (NML), an element management layer (EML) and a network element layer (NEL). In the TMN architecture, the management responsibilities are separated according to these layers. In every layer, an interface interacting with an adjacent layer is provided, and communication between applications is supported by the interface. Generally, a device related to the NML layer belongs to a network management system (NMS), whereas a device related to the EML layer belongs to an element management system (EMS), and the functions of the NEL layer are embedded in a network element. The network element is further divided into a front administrator module (FAM) and a back administrator module (BAM). The FAM and the BAM are internally connected, and provide management functions, such as configuration, maintenance, traffic measurement and failure reporting for each function module in the network element.

With rapid development of telecommunication technologies, telecommunication convergence (such as service convergence, network convergence, transmission convergence, charging convergence, network management convergence and terminal device convergence) has emerged for future telecommunication development. In the future, telecommunication convergence will not merely be applied among network elements (such as network devices) of a single operator but also among networks elements of a plurality of operators. Through sharing and the convergence of the network elements among the plurality of operators, a total cost of ownership (TCO) of network construction of each operator may be greatly reduced. With further deployment of network convergence, how to ensure a secure management on the shared network elements becomes an important issue.

In accordance with the foregoing TMN architecture, a method for managing a network element as provided by the prior art includes authority-based management and domain-based management. Authority-based management assigns management users into different categories according to different operation authorities. Domain-based management divides, according to different domains, an entire network into sub-networks of the different domains, and then assigns the management users into different categories according to the different management domains.

Although the authority-based management and the domain-based management described above improve security of current network management to a limited extent, such network configurations were developed for network management by only a single operator. Managements of users from different operators are physically separated by different telecommunication management network devices on the network management layer. In addition, in the prior art, when a plurality of operators share a certain network element, every operator has access to operate all resources on the network element, resulting in a security risk to the operators.

SUMMARY

Embodiments of the present invention provide a method, a device for operating a resource on a shared network element and an element management system, all of which can be used for solving a resource security problem that occurs when applying a network management solution of the prior art on a shared network element.

In one aspect, a method for operating a resource on a shared network element is provided, where the shared network element is accessible by a plurality of operators. The method includes: receiving, by the shared network element, from a user associated with one of the operators, an operation management command for operating a resource on the shared network apparatus; acquiring, by the shared network element, an operator attribute of the resource to be operated and an operator attribute of the user according to the operation management command; determining, by the shared network element, whether the operator attribute of the user is consistent with the operator attribute of the resource to be operated; and in instances where the operator attribute of the user is consistent with the operator attribute of the resource to be operated, performing, by the shared network element, an operating action corresponding to the operation management command on the resource to be operated; wherein the operator attribute of the user indicates an operator with which the user associates, and the operator attribute of the resource to be operated indicates an operator to which the resource to be operated belongs.

In another aspect, a shared network element is provided, which includes: a receiver, configured to receive, from a user associated with one of a plurality of operators having access to the shared network element, an operation management command for operating a resource on the shared network element; a processor, configured to acquire an operator attribute of the user and an operator attribute of the resource to be operated according to the operation management command, determine whether the operator attribute of the user is consistent with the operator attribute of the resource to be operated, and perform an operating action corresponding to the operation management command on the resource to be operated in instances where the operator attribute of the user is consistent with the operator attribute of the resource to be operated; wherein the operator attribute of the user indicates an operator with which the user associates, and the operator attribute of the resource to be operated indicates an operator to which the resource to be operated belongs.

In yet another aspect, a communication system is provided, which includes a network management apparatus and a shared network element.

The network management apparatus is configured to receive from a user associated with one of the operators an operation management command for operating a resource on the shared network element, acquire an operator attribute of the user, and send the operation management command with the operator attribute of the user to the shared network element; and the shared network element is configured to receive the operation management command with the operator attribute of the user, acquire an operator attribute of the resource to be operated according to the operation management command, determine whether the operator attribute of the user is consistent with the operator attribute of the resource to be operated and perform an operating action corresponding to the operation management command on the resource to be operated in instances where the operator attribute of the user is consistent with the operator attribute of the resource to be operated; wherein the operator attribute of the user indicates an operator with which the user associates, and the operator attribute of the resource to be operated indicates an operator to which the resource to be operated belongs.

In the embodiments of the present invention, the operation management command from the user is received, and the operator attribute of the user and the operator attribute of the resource to be operated by the operation management command are acquired. The operator attribute of the user is matched or compared with the operator attribute of the resource to be operated, and if it is determined that they are consistent with each other, the operating action corresponding to the operation management command is performed. Otherwise, a failure message is directly returned to the user. Therefore, even if a plurality of operators shares the same network element, each operator may manage the network element relatively independently, and it may be guaranteed that a management user of an operator can operate a relevant resource belonging to the operator on the shared network element and cannot operate a resource belonging to another operator.

DETAILED DESCRIPTION OF THE EMBODIMENTS

Figure 1:
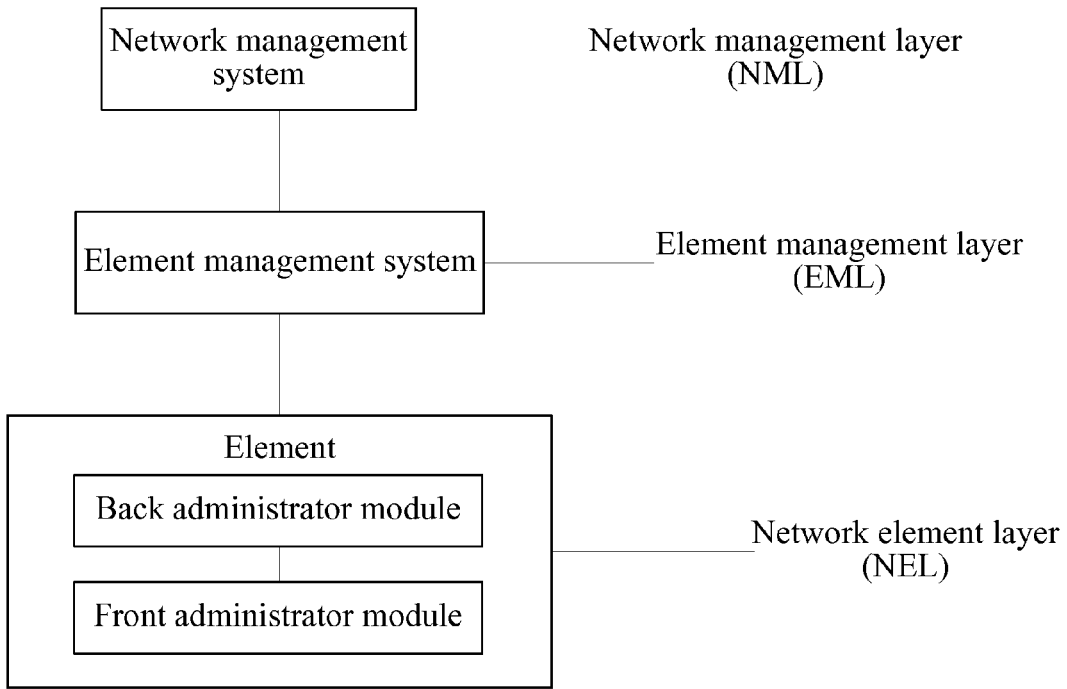
FIG. 1 is a schematic diagram of a telecommunication management network architecture according to an embodiment of the present invention.

An embodiment of the present invention provides a method for operating a resource on a shared network element. In the method, an operation management command from a user is received, an operator attribute of the user is acquired, and when the operator attribute of the user is consistent with an operator attribute of the resource to be operated, an operating action corresponding to the operation management command is performed. Embodiments of the present invention further provide a corresponding element management system and a network element, which are detailed in the following.

In an embodiment of the present invention, resources on a shared network element are classified. For example, two types (or two levels) of resources are defined: common resources and specialized resources, where the common resources do not belong to any operator, but belong to common resources of the shared network element device, such as a power supply or a cabinet. The specialized resources are resources exclusively belonging to a certain operator, such as carrier frequency resources in a base station system which may be shared by a plurality of operators. The specialized resources are subdivided according to the operators to which they belong. For example, the specialized resources may be subdivided into specialized resources of an operator A and specialized resources of an operator B.

Generally, when resource configuration is performed on the shared network element, resources are identified by adding operator attributes. These operator attributes indicate the operators to which the resources belong. When configuring operator attributes of the resources, certain field may be adopted to identify the operator attributes of the resources. For example, a field 0x0000 can be used to identify that a resource does not belong to any operator and is a common resource on the shared network element. A field 0xabcd can be used to identify that a resource is a specialized resource of an operator numbered 0xabcd.

Alternatively, a resource to be operated and an operator attribute thereof may also be identified simultaneously. For example, the operator attribute may be directly encoded into an identifier (ID) of the resource to be operated, and the format of the ID may be:

| Operator code | Resource to be operated object code |
| --- | --- |

That is, the identifier of the resource carries the operator attribute of the resource.

It should be noted that, in an embodiment of the present invention, the resources may be organized in the form of an object tree. In this way, the operator attributes of the resources follow a compliance principle, that is, an operator attribute of a child node (a resource object) inherits an operator attribute of a parent node (a resource object). For example, when the parent node is already configured with the operator attribute 0x1234 (identified by a field 0x1234), successively lower level child nodes automatically inherit the operator attribute 0x1234 (identified by the field 0x1234) of the parent node. The child node cannot be changed into another operator attribute, unless the operator attribute of the parent node belongs to no operator. In other words, if the operator attribute of the parent node is a common resource (the operator attribute of the common resource belongs to no operator), the operator attribute of the child node may be configured. The compliance principle and the form of the object tree simplifies the process of configuring the operator attribute of the resource, thereby improving the efficiency and convenience of configuring the operator attribute of the resource.

In an embodiment of the present invention, management users capable of operating a shared network element are classified, for example, into three types (or three levels): common management users, operator management users and privileged users, where a common management user can only operate a common resource on the shared network element, an operator management user can only operate a resource exclusively belonging to a certain operator on the shared network element, and a privileged user may operate any resource on the shared network element.

Generally, when user configuration is performed on a network management device, management users are identified by adding operator attributes. Certain field may be adopted to identify the users. For example, a field 0x0000 can be used to identify a user as a common management user, a field 0xabcd can be used to identify a user as an operator management user with the operator numbered 0xabcd, and a field 0xFFFF can be used to identify a user as a privileged user.

Alternatively, a user and an operator attribute thereof may also be identified simultaneously. For example, the operator attribute may be directly encoded into an ID of the user, and the format of the ID may be: user ID=user name@operator. That is, the identifier of the user carries the operator attribute of the user.

It should be noted that, in an embodiment of the present invention, the operator attribute of the user follows an attribute compliance principle, that is, when a user A creates a new user B, the user B automatically inherits the operator attribute of the user A. The user A cannot create a user with an operator attribute different from that of the user A, unless the user A is a privileged user. Specifically, a privileged user may create a sub-user, and may configure the operator attribute of the sub-user. The attribute compliance principle simplifies the process of configuring the operator attribute of the sub-user, thereby improving the efficiency and convenience of configuring the operator attribute of the user.

Specifically, security control of the specialized resources is mentioned in the embodiment. It is that specialized resources exclusively belong to a certain operator, and only a management user of this operator may operate the specialized resources. The common resources do not belong to any operator, and a common management user may operate the common resources or management user of any category may operate the common resources. Specifically, a privileged management user may operate resources of any category.

In an embodiment of the present invention, the operator attributes of the resources may be configured in resource configuration information or in a resource configuration information database, and the operator attributes of the users may be configured in user configuration information or in a user configuration information database.

Specific deployment of the resource configuration information and the user configuration information may be very flexible, and they may be deployed on a network management device of any layer previously mentioned. For example, in a telecommunication management network architecture provided by an embodiment of the present invention shown in FIG. 1, the resource configuration information and the user configuration information may be specifically deployed on a network element layer, an element management layer, a network management layer or the like. They may be deployed on network management devices of the same layer, and may also be separately deployed on network management devices of different layers.

In practice, the resource configuration information may be configured on a network element, and the user configuration information may be configured on a network management device on any layer.

Figure 2:
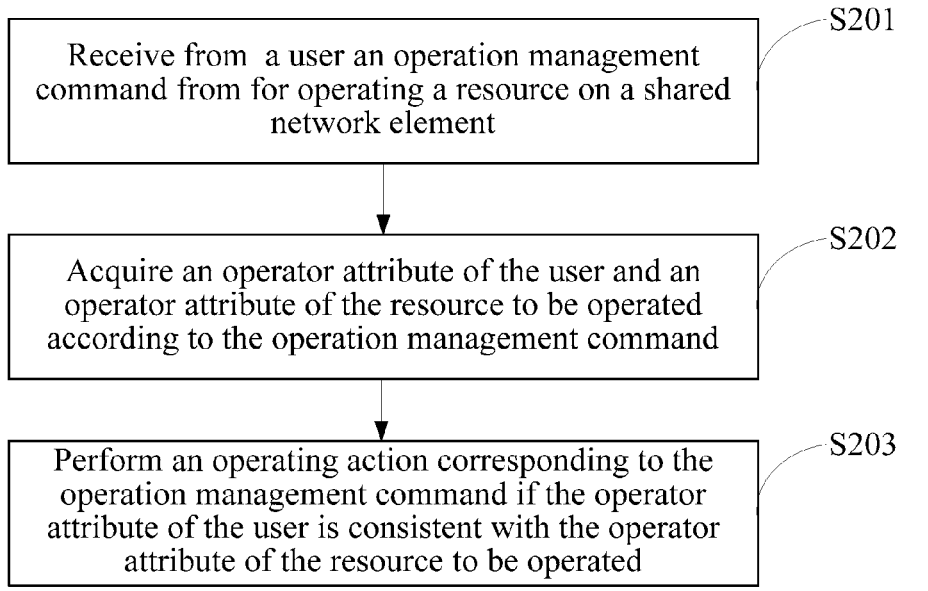
FIG. 2 is a schematic flow chart of a method for operating a resource on a shared network element according to Embodiment 1 of the present invention.

With reference to FIG. 2, a schematic flow chart is provided for operating a resource on a shared network element according to Embodiment 1 of the present invention.

In early stage of deployment of shared network elements, there may be only a part of network elements in a network system are shared. In this scenario, to minimize influences on other devices and network elements of the network system, the network management convergence may be implemented on a level of network elements. The user configuration information containing the operator attribute of a user, and resource configuration information containing the operator attribute of a resource to be operated, are both configured on the shared network element. In this way, when it is needed to operate a resource on the shared network element, a manager user may directly log into the shared network element and perform an operating action corresponding to an operation management command.

The method for operating a resource on a shared network element, of Embodiment 1 shown in FIG. 2, mainly includes the following steps:

Step S201: Receive, from a user, an operation management command for operating a resource on a shared network element.

In this embodiment, because a user configuration information database (configured with operator attributes of users) and a resource configuration information database (configured with operator attributes of resources) are both configured on the shared network element, the user directly logs into the shared network element through a maintenance console, and directly delivers the operation management command to the shared network element. The operation management command may carry an identifier of the resource to be operated. The operating action according to the operation management command may includes, but is not limited to, adding, modifying, deleting or querying.

Before receiving the operation management command from the user, the method may further includes: configuring the operator attribute of the resource to be operated and configuring the operator attribute of the user, or configuring an identity of the user for identifying both the user and the operator attribute thereof and configuring an identity of the resource for identifying both the resource to be operated and the operator attribute thereof. The specific configuration solutions are already illustrated in other part of the specification, and will not be described herein again.

Step S202: According to the operation management command, acquire the operator attribute of the user and the operator attribute of the resource to be operated.

When the user logs in, the user may be authenticated and login connection information of the user is established. In subsequent message processing, an identifier of the user may be acquired according to the login connection information of the user established at the time of the user logging into the shared network element. If the identifier of the user directly carries an operator attribute of the user, the operator attribute is directly acquired from the identifier of the user. If the operator attribute of the user is stored in the user configuration information database, then according to the identifier of the user, the user configuration information database is queried for acquiring the operator attribute of the user.

In this embodiment, the operation management command may carry an identifier of the resource to be operated. Therefore, the identifier of the resource to be operated may be acquired from the operation management command. If the identifier of the resource directly carries an operator attribute of the resource, the operator attribute is directly acquired from the identifier of the resource; if the operator attribute of the resource is stored in the resource configuration information database, then according to the identifier of the resource, the resource configuration information database is queried for acquiring the operator attribute of the resource to be operated.

Step S203: If the operator attribute of the user is consistent with the operator attribute of the resource to be operated, perform an operating action corresponding to the operation management command.

If the operator attribute of the user is consistent with the operator attribute of the resource to be operated, it is indicated that the operator with which the user associates and the operator to which the resource to be operated belongs are the same operator, and it is secure to perform the operating action corresponding to the operation management command from the user. For example, if the operator attribute of the user is P, and the operator attribute of the resource to be operated is also P, it is indicated that the operator with which the user associates and the operator to which the resource to be operated belongs are the same operator, and the operating action corresponding to the operation management command may be performed. If the operator attribute of the user is inconsistent with the operator attribute of the resource to be operated, the performing the operating action corresponding to the operation management command is blocked, and preferably, a message in response to the failure of the performing the command may be returned to the user.

Specifically, a privileged user may operate all the resources on the shared network element. It may be regarded that the operator attribute of the privileged user is consistent with the operator attribute of any resource on the shared network element. In an embodiment of the present invention, if the operator attribute of the user is determined as a privileged user, the operating action corresponding to the operation management command is performed.

In this embodiment, the operation management command of the user is received, and the operator attribute of the user and the operator attribute of the resource to be operated by the operation management command are acquired. When the operator attribute of the user and the operator attribute of the resource to be operated are consistently matched, the operating action corresponding to the operation management command is performed. When they are unmatched or inconsistent, a failure message is directly returned, and the performing the operating action corresponding to the operation management command is blocked. Therefore, even if a plurality of operators shares the same network element, each operator may still manage the network element relatively independently. It may be guaranteed that a manager user of an operator can operate a relevant resource belonging to the operator on the shared network element and cannot operate a resource belonging to another operator.

To understand Embodiment 1 of the present invention more clearly, Examples E1 and E2 that two operators share a base station controller (BSC) of one base station system are illustrated as following.

Figure 3:
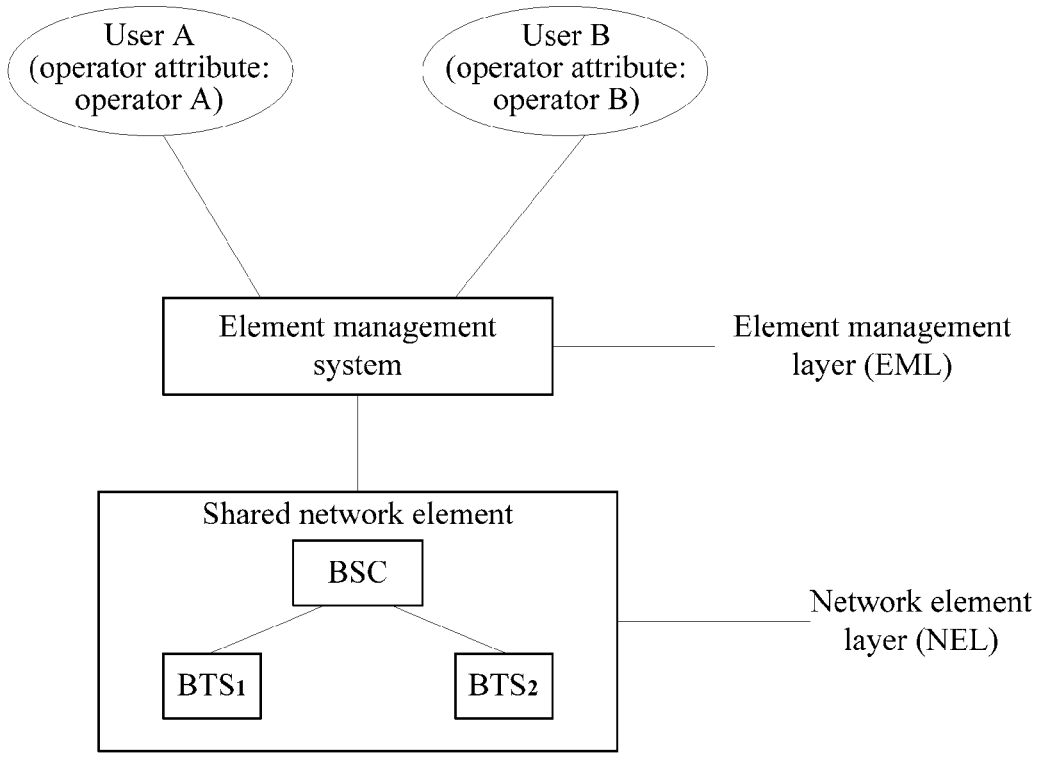
FIG. 3 is a schematic diagram of network management for two operators sharing one base station system in convergence network according to an embodiment of the present invention.

As shown in FIG. 3, a shared network element BSC of an operator A and an operator B controls a base transceiver station 1 ($BTS_1$) and a base transceiver station 2 ($BTS_2$). It is assumed that a cell carrier frequency resource $C_1$ belongs to the operator A, a cell carrier frequency resource $C_2$ belongs to the operator B, the operator attribute of a user $U_1$ is A, and the operator attribute of a user $U_2$ is B. The user $U_1$ or the user $U_2$ may directly log into the shared network element BSC through a maintenance console, and operates the cell carrier frequency resources belonging to its corresponding operator on the shared network element BSC.

EXAMPLE E1

Step S1: user $U_1$ inputs an operation management command for modifying a cell carrier frequency resource $C_1$.

Step S2: A BSC receives the operation management command.

Step S3: The BSC acquires the operator attribute A of the user $U_1$, and if the operator attribute A of the user $U_1$ indicates that the user $U_1$ is a privileged user, directly proceed to step S6; otherwise, continue with step S4.

Step S4: According to an identifier of the cell carrier frequency resource $C_1$ in the operation management command, the BSC queries a resource configuration information database to acquire the operator attribute A of the cell frequency carrier resource $C_1$.

Step S5: Determine whether the operator attribute of the user $U_1$ and the operator attribute of the cell carrier frequency resource $C_1$ are consistent (that is, determine whether the user $U_1$ and the cell carrier frequency resource $C_1$ both belong to an operator A), and if they are consistent, continue with step S6; and if they are inconsistent, block the performing the operation management command, and return a failure response.

Step S6: Perform the operation of modifying the cell carrier frequency resource $C_1$, and return a success response after the operation is finished.

Because the operator attribute of the user $U_1$ is consistent with the operator attribute of the cell carrier frequency resource $C_1$ (that is, the user $U_1$ and the cell carrier frequency resource $C_1$ both belong to the operator A), a result of the above Example E1 is to perform the operation of modifying the cell carrier frequency resource $C_1$ and return a success response after the operation is finished.

EXAMPLE E2

Step S1: User $U_1$ inputs an operation management command for modifying a cell carrier frequency resource $C_2$.

Step S2: A BSC receives the operation management command.

Step S3: The BSC acquires the operator attribute A of the user $U_1$, and if the operator attribute A of the user $U_1$ indicates that the user $U_1$ is a privileged user, directly proceed to step S6; otherwise, continue with step S4.

Step S4: According to an identifier of the cell carrier frequency resource $C_2$, the BSC queries a resource configuration information database to acquire the operator attribute of the cell carrier frequency resource $C_2$.

Step S5: The BSC determines whether the operator attribute of the user $U_1$ and the operator attribute of the cell carrier frequency resource $C_2$ are consistent (that is, determine whether the user $U_1$ and the cell carrier frequency resource $C_2$ both belong to an operator A), and if they are consistent, continue with step S6; and if they are inconsistent, terminate the performing the operation management command, and return a failure response.

Step S6: The BSC performs the operation of modifying the cell carrier frequency resource $C_2$, and returns a success response after the operation is finished.

Because the operator attribute of the user $U_1$ is inconsistent with the operator attribute of the cell carrier frequency resource $C_2$ (the user $U_1$ belongs to an operator A, and the cell carrier frequency resource $C_2$ belongs to an operator B), a result of the above Example E2 is to block the performing the operation of modifying the cell carrier frequency resource $C_2$ and return a failure response.

It can be learned from Embodiment 1 of the present invention that, the operation management command of the user is received, the operator attribute of the user and the operator attribute of the resource to be operated by the operation management command are acquired, the operator attribute of the user is matched or compared with the operator attribute of the resource to be operated. When they are consistently matched, the operating action corresponding to the operation management command is performed. Otherwise, the operating action is blocked and a failure message is directly returned. Therefore, even if a plurality of operators shares the same network element, each operator may still manage the network element relatively independently. It may be guaranteed that a management user of an operator can operate a relevant resource belonging to the operator on the shared network element and cannot operate a resource belonging to another operator.

In late stage of deployment of shared network elements, with large scale popularization of the shared network elements, the number of shared network elements is large. In this scenario, the user configuration information may be configured on configured on upper layer, for example, configured on an EMS. The resource configuration information may be configured on the shared network element. In this way, the difficulty of the configuration and maintenance of user configuration information database is reduced.

In Embodiment 2 of the present invention, the user configuration information may be configured on an EMS, and the resource configuration information may be configured on the shared network element.

Figure 4:
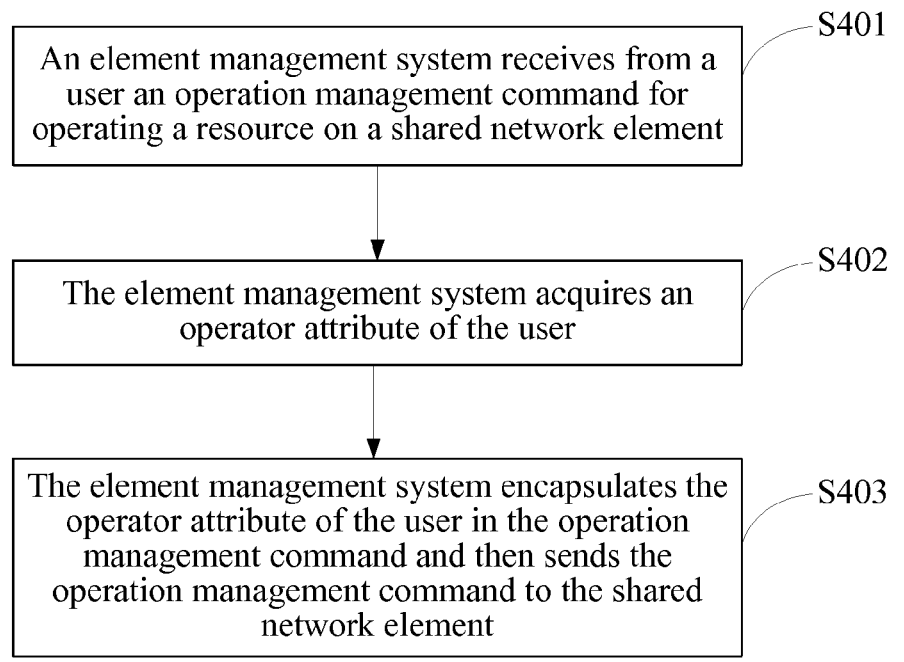
FIG. 4 is a schematic flow chart of a method for operating a resource on a shared network element according to Embodiment 2 of the present invention.

FIG. 4 shows a schematic flow chart of a method for operating a resource on a shared network element according to Embodiment 2 of the present invention. The method mainly includes the following steps:

Step S401: The element management system receives, from a user, an operation management command for operating a resource on a shared network element, where the identifier of the resource may be carried in the operation management command.

In this embodiment, a user configuration information database (configured with operator attributes of users) is configured in the element management system. Therefore, the user firstly logs into the element management system through a maintenance console, and the operation management command is delivered to the shared network element through the EMS. Besides, in this embodiment, the operator attribute of the user may not be configured on the shared network element. The element management system may guarantee that the operation management command delivered to the shared network element carries the operator attribute of the user.

Before receiving the operation management command from the user, the method may further includes: configuring the operator attribute of the resource to be operated and configuring the operator attribute of the user, or configuring an identity of the user for identifying both the user and the operator attribute thereof and configuring an identity of the resource for identifying both the resource to be operated and the operator attribute thereof. The specific configuration solutions are already illustrated in other part of the specification, and will not be described herein again.

Step S402: The element management system acquires the operator attribute of the user.

In this embodiment, the element management system acquires an identifier of the user according to login connection information of the user established at the time of the user logging into the shared network element. If the identifier of the user directly carries an operator attribute of the user, the operator attribute is directly acquired from the identifier of the user. If the operator attribute of the user is stored in the user configuration information database, then according to the identifier of the user, the user configuration information database is queried for acquiring the operator attribute of the user.

Step S403: The element management system encapsulates the operator attribute of the user in the operation management command and then sends the operation management command to the shared network element.

When the shared network element receives the operation management command sent by the element management system, an identifier of the resource to be operated is acquired from the operation management command, and the operator attribute of the user may also be acquired from the operation management command. For example, by parsing the operation management command, the operator attribute of the user encapsulated in the operation management command is acquired. As to the operator attribute of the resource, if the identifier of the resource directly carries an operator attribute of the resource, the operator attribute is directly acquired from the identifier of the resource. If the operator attribute of the resource is stored in a resource configuration information database, then according to the identifier of the resource, the resource configuration information database is queried for acquiring the operator attribute of the resource.

Further, the shared network element compares the operator attribute of the user with the operator attribute of the resource to be operated. If the operator attribute of the user is consistent with the operator attribute of the resource to be operated, it is indicated that the operator with which the user associates and the operator to which the resource to be operated belongs are the same operator, and it is secure to perform an operating action corresponding to the operation management command from the user. For example, the operator attribute of the user indicates that the user is allowed to operate a resource exclusively belonging to an operator P on the shared network element, and the operator attribute of the resource to be operated indicates that the resource to be operated exclusively belongs to the operator P (that is, the manager user of operator P may operate the resource to be operated). It is indicated that the operator with which the user associates and the operator to which the resource to be operated belongs is the same operator. Therefore, the operating action corresponding to the operation management command may be performed. If the operator attribute of the user is inconsistent with the operator attribute of the resource to be operated, the performing the operating action corresponding to the operation management command is blocked.

Similar to disclosure of Embodiment 1, a privileged user may operate all the resources on the shared network element. The operator attribute of the privileged user may be regarded as being consistent with the operator attribute of any resource on the shared network element. Therefore, in the embodiment of the present invention, if the operator attribute of the user is determined as a privileged user, the operating action corresponding to the operation management command is performed.

To understand Embodiment 2 of the present invention more clearly, Example E3 that two operators share a base station controller (BSC) of one base station system as shown in FIG. 3 is illustrated as following.

Different form Embodiment 1, the user configuration information may be configured on the element management system. A user $U_1$ or a user $U_2$ may log into the element management system through a maintenance console, and forwards an operation management command to a shared network element BSC through the element management system, so that the operation of a cell carrier frequency resource belonging to its corresponding operator on the shared network element BSC is implemented.

EXAMPLE E3

Step S1: User $U_1$ inputs an operation management command for modifying a cell carrier frequency resource $C_1$, where the operation management command carries an identifier of the cell carrier frequency resource $C_1$.

Step S2: An element management system receives the operation management command.

Step S3: The element management system acquires an identifier of the $U_1$ according to user login connection information and queries a configuration information database according to the identifier of the user $U_1$ to acquire the operator attribute of the user $U_1$.

Step S4: The element management system sends, to a BSC, the operation management command of the user $U_1$ for modifying the cell carrier frequency resource $C_1$, where this operation management command is encapsulated with the acquired operator attribute of the user $U_1$.

Step S5: The BSC receives the operation management command encapsulated with the operator attribute of the user $U_1$.

Step S6: The BSC determines whether the user $U_1$ is a privileged user according to the operator attribute of the user $U_1$, and if it is a privileged user, directly proceed to step S9; otherwise, continue with step S7.

Step S7: The BSC queries a resource configuration information database according to the identifier of the cell carrier frequency resource $C_1$ to acquire the operator attribute of the cell carrier frequency resource $C_1$.

Step S8: The BSC determines whether the operator attribute of the user $U_1$ and the operator attribute of the cell carrier frequency resource $C_1$ are consistent (that is, determine whether the user $U_1$ and the cell carrier frequency resource $C_1$ both belong to an operator A), and if they are consistent, continue with step S9; If they are inconsistent, blocks the performing the operation management command, and returns a failure response.

Step S9: The BSC performs the operation of modifying the cell carrier frequency resource $C_1$, and returns a success response after the operation is finished.

Because the operator attribute of the user $U_1$ is consistent with the operator attribute of the cell carrier frequency resource $C_1$ (that is, the user $U_1$ and the cell carrier frequency resource $C_1$ both belong to the operator A), a result of the above Example E3 is to perform the operation of modifying the cell carrier frequency resource $C_1$ and return a success response after the operation is finished.

It can be learned from Embodiment 2 of the present invention that, the operation management command of the user is received, and the operator attribute of the user and the operator attribute of the resource to be operated by the operation management command are acquired. The operator attribute of the user is matched or compared with the operator attribute of the resource to be operated. When they are consistently matched, an operating action corresponding to the operation management command is performed. Otherwise, the operating action is blocked and a failure message is directly returned. Therefore, even if a plurality of operators shares the same network element, each operator may still manage the network element relatively independently. It may be guaranteed that a management user of an operator can operate a relevant resource belonging to the operator on the shared network element and cannot operate a resource belonging to another operator.

Figure 5:
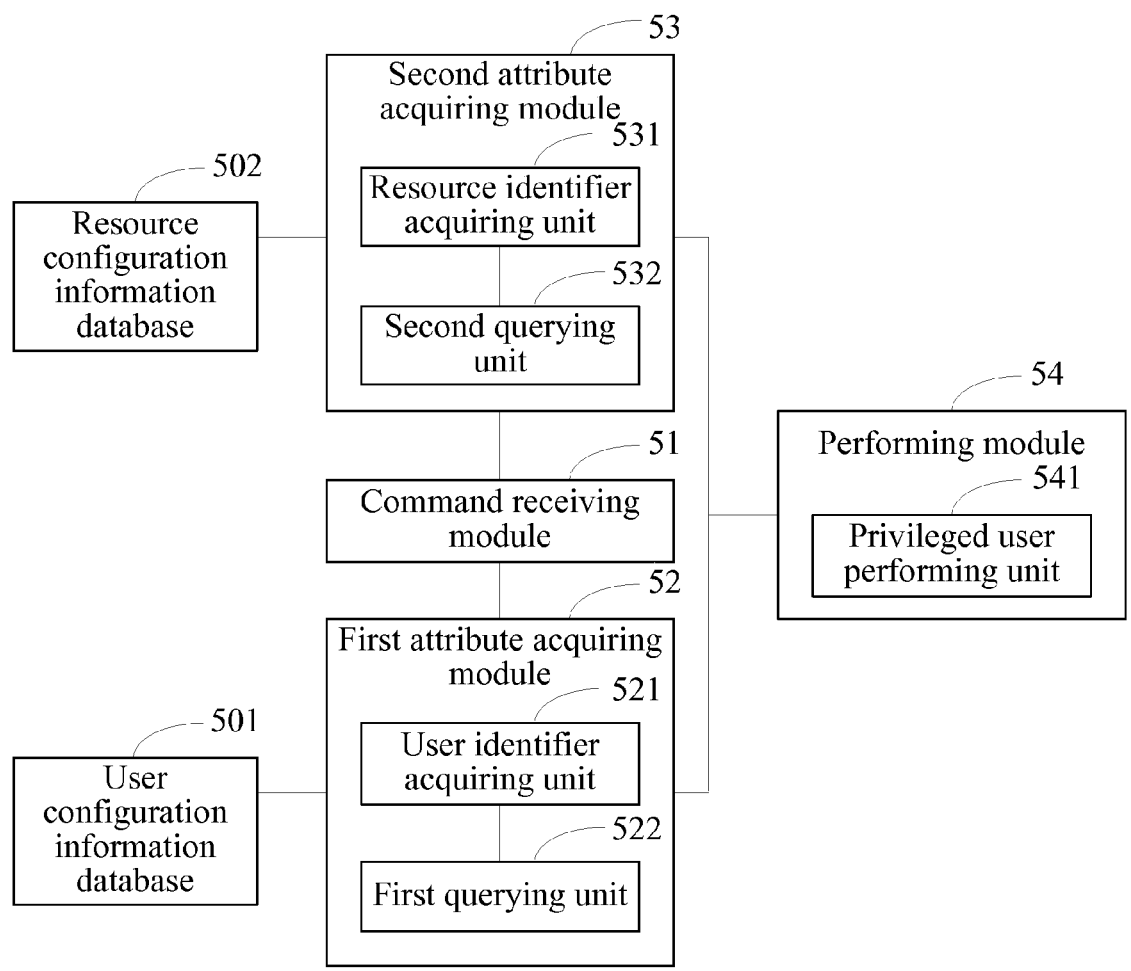
FIG. 5 is a block diagram of a shared network element according to an embodiment of the present invention.

With reference to FIG. 5, a block diagram of a shared network element is provided according to an embodiment of the present invention. For ease of illustration, only a part related to the embodiment of the present invention is shown. Function modules in a shared network element may be a software module, a hardware module or a module of a combination of the software and the hardware, which are described in detail in the following.

A command receiving module 51 is configured to receive, from a user, an operation management command for operating a resource on the shared network element, where the operation management command carries an identifier of the resource to be operated.

A first attribute acquiring module 52, configured to acquire an operator attribute of the user according to the operation management command received by the command receiving module 51, includes:

a user identifier acquiring unit 521, configured to acquire an identifier of the user according to login connection information of the user established at the time of the user logging into the shared network element; and a first querying unit 522, configured to query a user configuration information database 501 according to the identifier of the user.

A second attribute acquiring module 53, configured to acquire an operator attribute of the resource to be operated according to the operation management command received by the command receiving module 51, includes:

a resource identifier acquiring unit 531, configured to acquire an identifier of the resource from the operation management command received by the command receiving module 51; and a second querying unit 532, configured to query a resource configuration information database 502 according to the identifier of the resource to be operated acquired by the resource identifier acquiring unit 531.

A performing module 54 is configured to perform an operating action corresponding to the operation management command when the operator attribute of the user acquired by the first attribute acquiring module 52 is consistent with the operator attribute of the resource to be operated acquired by the second attribute acquiring module 53.

Besides, the performing module 54 may include a privileged user performing unit 541, configured to determine whether the user is a privileged user, and if the operator attribute of the user is a privileged user, perform the operating action corresponding to the operation management command.

The operator attribute of the user indicates the operator with which the user associates and the category of resources on the shared network element may be operated by the user. For example, if the operator attribute of the user indicates the user is a common management user, the user can operate a common resource on the shared network element. If the operator attribute of the user indicates the user is an operator management user, the user can operate a resource exclusively belonging to a certain operator on the shared network element. If the operator attribute of the user indicates the user is a privileged user, the user may operate any resource on the shared network element. Generally, when user configuration is performed on a network management device, management users are identified adding operator attributes. For example, the operator attribute of the user may be configured in a database, such as the user configuration information database 501 or may also be directly configured in the identifier of the user. Likewise, the operator attribute of the resource to be operated may be configured in a database, such as the resource configuration information database 502, or may also be directly configured in the identifier of the resource to be operated. The specific configuration solutions are already illustrated in other part of the specification, and will not be described herein again.

In this embodiment, when the user logs in, the user may be authenticated and login connection information of the user is established. The user identifier acquiring unit 521 the first attribute acquiring module 52 may acquire the identifier of the user according to the login connection information of the user established at the time of the user logging into the shared network element. If the identifier of the user directly carries an operator attribute of the user, the first attribute acquiring module 52 directly acquires the operator attribute of the user from the identifier of the user. If the operator attribute of the user is stored in a user configuration information database, then the first querying unit 522 of the first attribute acquiring module 52 queries the user configuration information database 501 (stored in the shared network element) according to the identifier of the user to acquire the operator attribute of the user.

The command receiving module 51 receives the operation management command from the user, where the operation management command contains the identifier of the resource. If the identifier of the resource directly carries an operator attribute of the resource, the resource identifier acquiring unit 531 of the second attribute acquiring module 53 may directly acquire the identifier of the resource from the operation management command. If the operator attribute of the resource is stored in a resource configuration information database, the second querying unit 532 of the second attribute acquiring module 53 queries the resource configuration information database 502 (stored in the shared network element) of the resource to be operated according to the identifier of the resource to be operated acquired by the resource identifier acquiring unit 531. If the operator attribute of the user acquired by the first attribute acquiring module 52 is consistent with the operator attribute of the resource to be operated acquired by the second attribute acquiring module 53, the performing module 54 performs the operating action corresponding to the operation management command. Otherwise, the performing the operating action corresponding to the operation management command is blocked.

It can be learned from the above embodiment of the present invention that when the operation management command of the user is received the operator attribute of the user and the operator attribute of the resource to be operated by the operation management command are acquired. The operator attribute of the user is matched or compared with the operator attribute of the resource to be operated. When they are consistently matched, the operating action corresponding to the operation management command is performed. Otherwise, the operating action is blocked and a failure message is directly returned. Therefore, even if a plurality of operators shares the same network element, each operator may still manage the network element relatively independently. It may be guaranteed that a management user of an operator can operate a relevant resource belonging to the operator on the shared network element and cannot operate a resource belonging to another operator.

Figure 6:
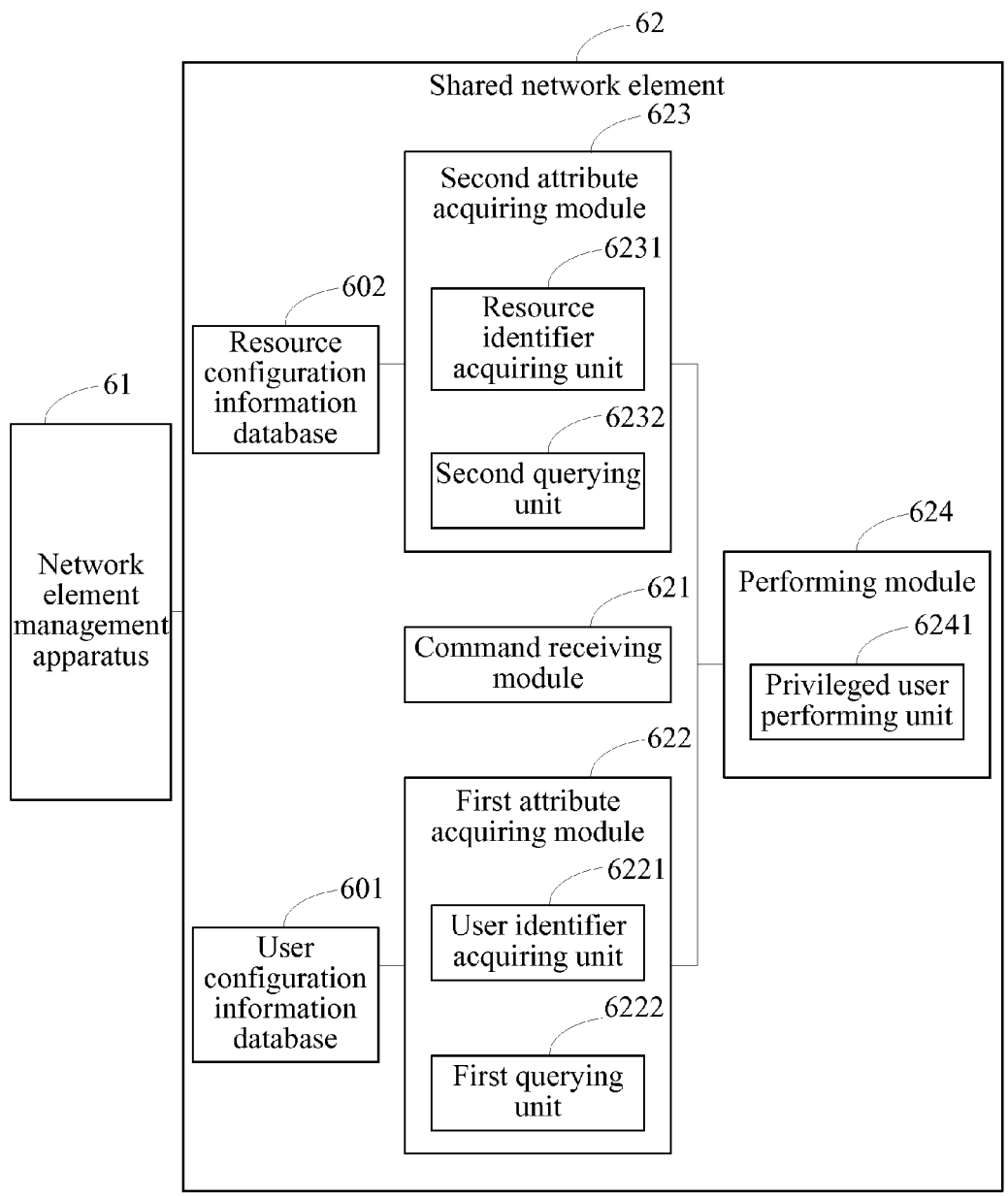
FIG. 6 is a block diagram of a communication system according to an embodiment of the present invention.

With reference to FIG. 6, a block diagram of a communication system is provided according to an embodiment of the present invention. For ease of illustration, only a part related to the embodiment of the present invention is shown. The communication system includes a network element management apparatus 61 and a shared network element 62, and function modules thereof are a software module, a hardware module or a module of a combination of the software and the hardware, which are described in detail in the following.

The network element management apparatus 61 is configured to provide a man-machine interface and send, to the shared network element 62, an operation management command input by a user through the man-machine interface, where the operation management command is used to operate a resource on a shared network element.

The shared network element 62 includes:

a command receiving module 621, configured to receive from the user the operation management command for operating a resource on the shared network element;

a first attribute acquiring module 622, configured to acquire the operator attribute of the user according to the operation management command received by the command receiving module 621;

and a second attribute acquiring module 623, configured to acquire the operator attribute of the resource to be operated according to the operation management command received by the command receiving module 621;

and a performing module 624, configured to perform an operating action corresponding to the operation management command when the operator attribute of the user acquired by the first attribute acquiring module 622 is consistent with the operator attribute of the resource to be operated acquired by the second attribute acquiring module 623, The first attribute acquiring module 622 may include:

a user identifier acquiring unit 6221, configured to acquire an identifier of the user according to login connection information of the user established at the time of the user logging into the shared network element; and a first querying unit 6222, configured to query a user configuration information database 601 according to the identifier of the user.

The command receiving module 621 may include:

a resource identifier acquiring unit 6231, configured to acquire an identifier of the resource from the operation management command received by the command receiving module 621; and a second querying unit 6232, configured to query a resource configuration information database 602 according to the identifier of the resource to be operated acquired by the resource identifier acquiring unit 6231. The performing module 624 may include a privileged user performing unit 6241, configured to determine whether the user is a privileged user, and if the operator attribute of the user indicates the user is a privileged user, perform the operating action corresponding to the operation management command.

It should be noted that, information interactions and implementation processes between the modules/units in the above device are based on the same concept as the method embodiments of the present invention, so reference may be made to the description in the method embodiments of the present invention for details, and details are not repeated herein.

Persons of ordinary skill in the art should understand that all or a part of the steps of methods according to the embodiments may be implemented by a program instructing relevant hardware. The program may be stored in a computer readable medium, and the storage medium may include a Read Only Memory (ROM), a Random Access Memory (RAM), a magnetic disk, or an optical disk.

The method for operating a resource on a shared network element, the shared network element and the relevant device provided by the embodiments of the present invention are described in detail above. The principle and implementation of the present invention are described herein through specific examples. The description about the embodiments is merely provided for ease of understanding of the method and the core ideas of the present invention. Persons of ordinary skill in the art can make variations to the present invention in terms of the specific implementation and application scope according to the ideas of the present invention. Therefore, the specification shall not be construed as a limit to the present invention.

What is claimed is:

1. A method for operating a resource on a shared network element, comprising:

receiving, from a user, an operation management command for operating a resource on a shared network element;

acquiring an operator attribute of the resource to be operated and acquiring an operator attribute of the user according to the operation management command; and performing an operating action corresponding to the operation management command if the operator attribute of the user is consistent with the operator attribute of the resource to be operated, and wherein if the operator attribute of the user is inconsistent with the operator attribute of the resource to be operated, the performing the operating action corresponding to the operation management command is terminated;

wherein the acquiring the operator attribute of the user comprises: acquiring an identifier of the user from login connection information of the user and querying a user configuration information base of the user according to the identifier of the user to acquire the operator attribute of the user;

wherein the acquiring the operator attribute of the resource to be operated according to the operation management command comprises: acquiring an identifier of the resource to be operated from the operation management command and querying a resource configuration information base of the resource to be operated to acquire the operator attribute of the resource to be operated.

2. The method according to claim 1, wherein the acquiring the operator attribute of the user comprises:

acquiring an identifier of the user from login connection information of the user; and acquiring the operator attribute of the user from the identifier of the user.

3. The method according to claim 1, wherein the acquiring the operator attribute of the user comprises:

acquiring the operator attribute of the user from the operation management command.

4. The method according to claim 1, wherein the acquiring the operator attribute of the resource to be operated according to the operation management command comprises:

acquiring an identifier of the resource to be operated from the operation management command, and acquiring the operator attribute of the resource to be operated from the identifier of the resource to be operated.

5. The method according to claim 1, wherein after the acquiring the operator attribute of the user, the method further comprises:

determining whether the user is a privileged user, and if the operator attribute of the user is a privileged user, performing the operating action corresponding to the operation management command.

6. A shared network element, comprising:

a computer processor coupled to a memory;

a command receiving module, configured to receive, from a user, an operation management command for operating a resource on the shared network element, wherein the operation management command carries an identifier of the resource to be operated;

a first attribute acquiring module, configured to acquire an operator attribute of the user according to the operation management command;

a second attribute acquiring module, configured to acquire an operator attribute of the resource to be operated according to the operation management command; and a performing module, configured to perform an operating action corresponding to the operation management command when the operator attribute of the user is consistent with the operator attribute of the resource to be operated, and where in if the operator attribute of the user is inconsistent with the operator attribute of the resource to be operated, the performing the operating action corresponding to the operation management command is terminated;

wherein the first attribute acquiring module further comprises a user identifier acquiring unit configured to acquire an identifier of the user according to login connection information of the user; and a first querying unit configured to query a user configuration information base according to the identifier of the user; and wherein the second attribute acquiring module further comprises a resource identifier acquiring unit configured to acquire the identifier of the resource from the operation management command received by the command receiving module and a second querying unit configured to query a resource configuration information base according to the identifier of the resource to be operated acquired by the resource identifier acquiring unit.

7. The shared network element according to claim 6, wherein the performing module comprises:

a privileged user performing unit, configured to determine whether the user is a privileged user, and if the operator attribute of the user is a privileged user, perform the operating action corresponding to the operation management command.

8. A communication system, comprising:

a network element management apparatus and a shared network element, wherein the network element management apparatus is configured to provide a man-machine interface, and send an operation management command input by a user through the man-machine interface to the shared network element, and the operation management command is used to operate a resource on the shared network element; and the shared network element comprises:

a computer processor coupled to a memory;

a command receiving module, configured to receive, from a user, the operation management command for operating the resource on the shared network element;

a first attribute acquiring module, configured to acquire an operator attribute of the user according to the operation management command;

a second attribute acquiring module, configured to acquire an operator attribute of the resource to be operated according to the operation management command; and a performing module, configured to perform an operating action corresponding to the operation management command when the operator attribute of the user acquired by the first attribute acquiring module is consistent with the operator attribute of the resource to be operated acquired by the second attribute acquiring module, and wherein if the operator attribute of the user is inconsistent with the operator attribute of the resource to be operated, the performing the operating action corresponding to the operation management command is terminated;

wherein the first attribute acquiring module further comprises a user identifier acquiring unit configured to acquire an identifier of the user according to login connection information of the user and a first querying unit configured to query a user configuration information base according to the identifier of the user; and wherein the second attribute acquiring module further comprises a resource identifier acquiring unit configured to acquire the identifier of the resource from the operation management command received by the command receiving module and a second querying unit configured to query a resource configuration information base according to the identifier of the resource to be operated acquired by the resource identifier acquiring unit.

* * * * *